(12) United States Patent
Sen et al.

(10) Patent No.: US 7,461,173 B2
(45) Date of Patent: Dec. 2, 2008

(54) DISTRIBUTING TIMERS ACROSS PROCESSORS

(75) Inventors: Sujoy Sen, Portland, OR (US); Linden Cornett, Portland, OR (US); Prafulla Deuskar, Hillsboro, OR (US); David B Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 870 days.

(21) Appl. No.: 10/882,521

(22) Filed: Jun. 30, 2004

(65) Prior Publication Data

US 2006/0031588 A1    Feb. 9, 2006

(51) Int. Cl.
G06F 15/16    (2006.01)

(52) U.S. Cl. ............... 709/250; 710/5; 703/25; 709/232; 709/201; 709/230; 709/223

(58) Field of Classification Search ........... 709/250; 370/466; 710/22, 48
See application file for complete search history.

(56) References Cited

U.S. PATENT DOCUMENTS

| | | | | |
|---|---|---|---|---|
| 4,484,264 A | * | 11/1984 | Friedli et al. | 709/250 |
| 4,945,473 A | * | 7/1990 | Holtey et al. | 703/25 |
| 5,166,674 A | | 11/1992 | Baum et al. | |
| 5,175,818 A | * | 12/1992 | Kunimoto et al. | 709/250 |
| 5,276,899 A | | 1/1994 | Neches | |
| 5,517,662 A | * | 5/1996 | Coleman et al. | 709/201 |
| 5,557,744 A | * | 9/1996 | Kobayakawa et al. | 709/232 |
| 5,768,529 A | * | 6/1998 | Nikel et al. | 709/232 |
| 5,884,046 A | * | 3/1999 | Antonov | 709/238 |
| 5,915,088 A | | 6/1999 | Basawaiah et al. | |
| 6,052,737 A | * | 4/2000 | Bitton et al. | 709/248 |
| 6,072,803 A | * | 6/2000 | Allmond et al. | 370/445 |
| 6,085,277 A | * | 7/2000 | Nordstrom et al. | 710/263 |
| 6,141,701 A | * | 10/2000 | Whitney | 710/5 |
| 6,345,302 B1 | * | 2/2002 | Bennett et al. | 709/236 |
| 6,360,262 B1 | * | 3/2002 | Guenthner et al. | 709/226 |
| 6,366,583 B2 | * | 4/2002 | Rowett et al. | 370/401 |
| 6,389,468 B1 | * | 5/2002 | Muller et al. | 709/226 |
| 6,427,171 B1 | * | 7/2002 | Craft et al. | 709/230 |
| 6,427,173 B1 | * | 7/2002 | Boucher et al. | 709/238 |
| 6,434,620 B1 | * | 8/2002 | Boucher et al. | 709/230 |
| 6,490,631 B1 | * | 12/2002 | Teich et al. | 709/250 |
| 6,631,422 B1 | | 10/2003 | Althaus et al. | |

(Continued)

FOREIGN PATENT DOCUMENTS

JP    03-035327    2/1997

(Continued)

OTHER PUBLICATIONS

Unknown Authors; Transmission Control Protocol; Jul. 25, 2008; Wikipedia Database search result for Transmission Control Protocol.*

(Continued)

*Primary Examiner*—Thuha T. Nguyen
*Assistant Examiner*—Anthony Fabbri
(74) *Attorney, Agent, or Firm*—Robert A. Greenberg

(57) ABSTRACT

A method of maintaining network protocol timers in data structures associated with different respective processors in a multi-processor system. The timers accessed by a respective one of the processors include timers of connections mapped to the processor.

2 Claims, 8 Drawing Sheets

Processor 102a
connections a-g

Processor 102b
connections h-n

Processor 102n
connections q-z

U.S. PATENT DOCUMENTS

| | | | |
|---|---|---|---|
| 6,671,273 | B1 | 12/2003 | Beck |
| 6,675,200 | B1 | 1/2004 | Cheriton et al. |
| 6,694,469 | B1 | 2/2004 | Jalali et al. |
| 6,697,868 | B2 * | 2/2004 | Craft et al. .................. 709/230 |
| 6,738,378 | B2 | 5/2004 | Tuck, III et al. |
| 6,751,676 | B2 * | 6/2004 | Fukuhara .................... 709/250 |
| 6,757,725 | B1 * | 6/2004 | Frantz et al. ................ 709/223 |
| 6,836,813 | B1 | 12/2004 | Gulick |
| 6,904,040 | B2 * | 6/2005 | Salapura et al. ........ 370/395.32 |
| 6,947,430 | B2 | 9/2005 | Bilic et al. |
| 2003/0014544 | A1 * | 1/2003 | Pettey ........................ 709/249 |
| 2003/0217231 | A1 | 11/2003 | Seidl et al. |
| 2003/0233497 | A1 | 12/2003 | Shih |
| 2004/0013117 | A1 * | 1/2004 | Hendel et al. ............... 370/394 |
| 2004/0030806 | A1 | 2/2004 | Pandya |
| 2004/0042487 | A1 * | 3/2004 | Ossman ...................... 370/466 |
| 2004/0225790 | A1 | 11/2004 | George et al. |
| 2005/0078694 | A1 | 4/2005 | Oner |
| 2005/0100042 | A1 | 5/2005 | Illikkal |
| 2005/0125580 | A1 | 6/2005 | Madukkarumukumana et al. |
| 2005/0138242 | A1 | 6/2005 | Pope et al. |
| 2005/0223128 | A1 * | 10/2005 | Vasudevan et al. ............ 710/22 |
| 2005/0223134 | A1 * | 10/2005 | Vasudevan et al. ............ 710/22 |
| 2006/0004933 | A1 * | 1/2006 | Sen et al. ...................... 710/48 |

FOREIGN PATENT DOCUMENTS

WO    WO 2005/104486 A1    11/2005

OTHER PUBLICATIONS

Wikipedia, the free encyclopedia: Transmission Control Protocol; pp. 1-10.

Pending U.S. Appl. No. 10/883,362, filed Jun. 30, 2004; Sujoy Sen Office Action dated Dec. 6, 2006.

Minturn, et al: Addressing TCP/IP Processing Challenges Using the IA and IXP Processors; Intel Technology Journal, vol. 7, Issue 4, Nov. 14, 2003; pp. 39-50.

Scalable Networking: Network Protocol Offload—Introducing TCP Chimney; WinHEC 204 Version—Apr. 9, 2004; 31 pages.

Transmission Control Protocol; Darpa Internet Program; Protocol Specification; RFC: 793; Sep. 1981; 84 pages.

Pending U.S. Appl. No. 10/883,362; Final Office Action dated Aug. 22, 2006.

Regnier, G.; Minturn, D.; McAlpine, G.; Saletore, V.; Foong, A. ETA: Experience with an Intel Xeon Processor as a Packet Processing Engine. Proceedings of the 11th Symposium on High Performance Interconnects, Aug. 2003. pp. 76-82.

Foong et L: TCP Performance Re-Visited, Intel; Dep't of Computer Science, Duke U., Durham, NC 27708; IEEE 2003.

Microsoft: Scalable Networking: Network Protocol Offload-Introducing TCP Chimney, WinHEC 2004 Version—Apr. 9, 2004, pp. 1-30.

Srihari Makineni, et al., "Performance Characterization of TCP/IP Paket Processing in Commercial Server Workloads", Network Architecture Labratory, Intel Corporation, 2003, pp. 33-41.

Non-Final Office Communication; U.S. Appl. No. 10/815,895, filed Mar. 31, 2004, mailing date Jan. 8, 2008, 18 pages.

Advisory Action Before the Filing of an Appeal Brief, U.S. Appl. No. 10/883,362, filed Jun. 30, 2004, mailing date Aug. 29, 2007, 3 pages.

Non-Final Office Action, U.S. Appl. No. 10/883,362, filed Jun. 30, 2004, mailing date Dec. 6, 2006, 10 pages.

Final Office Action, U.S. Appl. No. 10/883,362, filed Jun. 30, 2004, mailing date: Aug. 22, 2006, 9 pages.

Non-Final Rejection, U.S. Appl. No. 10/883,362, filed Jun. 30, 2004, mailing date: Apr. 3, 2006, 10 pages.

* cited by examiner

DISTRIBUTING TIMERS ACROSS PROCESSORS

REFERENCE TO RELATED APPLICATIONS

This relates to U.S. patent application Ser. No. 10/815,895, entitled "ACCELERATED TCP (TRANSPORT CONTROL PROTOCOL) STACK PROCESSING", filed on Mar. 31, 2004; this also relates to an application filed the same day as the present application entitled "NETWORK INTERFACE CONTROLLER INTERRUPT SIGNALING OF CONNECTION EVENT" naming Sujoy Sen, Anil Vasudevan, and Linden Cornett, as inventors and having U.S. Ser. No. 10/883,362.

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately.

A number of network protocols cooperate to handle the complexity of network communication. For example, a transport protocol known as Transmission Control Protocol (TCP) provides "connection" services that enable remote applications to communicate. TCP provides applications with simple commands for establishing a connection and transferring data across a network. Behind the scenes, TCP transparently handles a variety of communication issues such as data retransmission, adapting to network traffic congestion, and so forth.

To provide these services, TCP operates on packets known as segments. Generally, a TCP segment travels across a network within ("encapsulated" by) a larger packet such as an Internet Protocol (IP) datagram. Frequently, an IP datagram is further encapsulated by an even larger packet such as an Ethernet frame. The payload of a TCP segment carries a portion of a stream of data sent across a network by an application. A receiver can restore the original stream of data by reassembling the received segments. To permit reassembly and acknowledgment (ACK) of received data back to the sender, TCP associates a sequence number with each payload byte.

Many computer systems and other devices feature host processors (e.g., general purpose Central Processing Units (CPUs)) that handle a wide variety of computing tasks. Often these tasks include handling network traffic such as TCP/IP connections. The increases in network traffic and connection speeds have placed growing demands on host processor resources. To at least partially alleviate this burden, some have developed TCP Off-load Engines (TOEs) dedicated to off-loading TCP protocol operations from the host processor(s).

DETAILED DESCRIPTION

Many network protocols use timers to mark points in time. For example, Transmission Control Protocol (TCP) uses a number of different timers including a retransmit timer, keep-alive timer, persistence timer, and so forth. For instance, a retransmit timer identifies a time that an acknowledgment for transmitted data should be received before a retransmit occurs.

Figure 1:
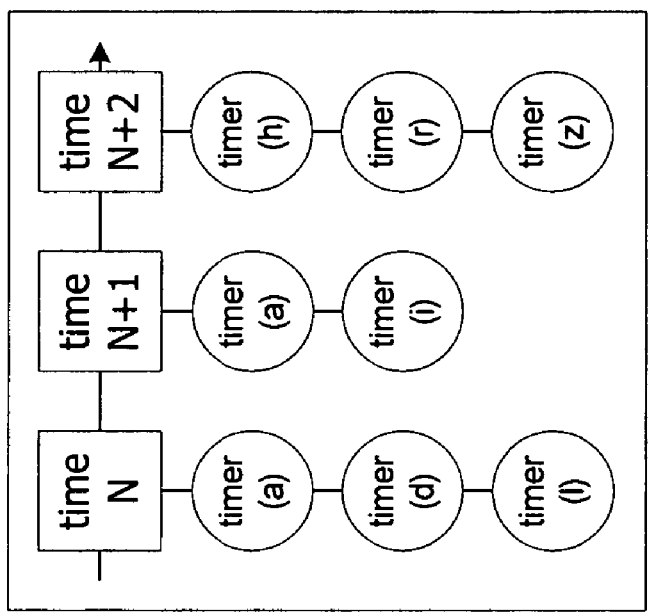
FIG. 1 is a diagram of a timer data structure

FIG. 1 depicts a sample data structure that manages timers. As shown, the data structure features a series of time buckets (labeled "time N", "time N+1", "time N+2"). Attached to each bucket is a list of timers associated with a given time. For example, time "N" has three associated timers: one for connections labeled "a", "d", and "l". Though not shown, a particular connection may have multiple timers associated with a given time (e.g., a connection may have both an acknowledgment timer and a keep-alive timer armed for the same time). At a given time, the timers associated with a bucket are processed and appropriate actions (e.g., segment retransmission) are performed.

Potentially, a given host system may have multiple processors performing TCP operations. Providing each processor with access to a monolithic data structure like that shown in FIG. 1 to arm, disarm, and/or process timers can substantially degrade overall system performance. For example, potential access contention by the different processors may necessitate locking schemes. Additionally, access by different processors may prevent efficient caching of the data structure by the processors.

Figure 2:
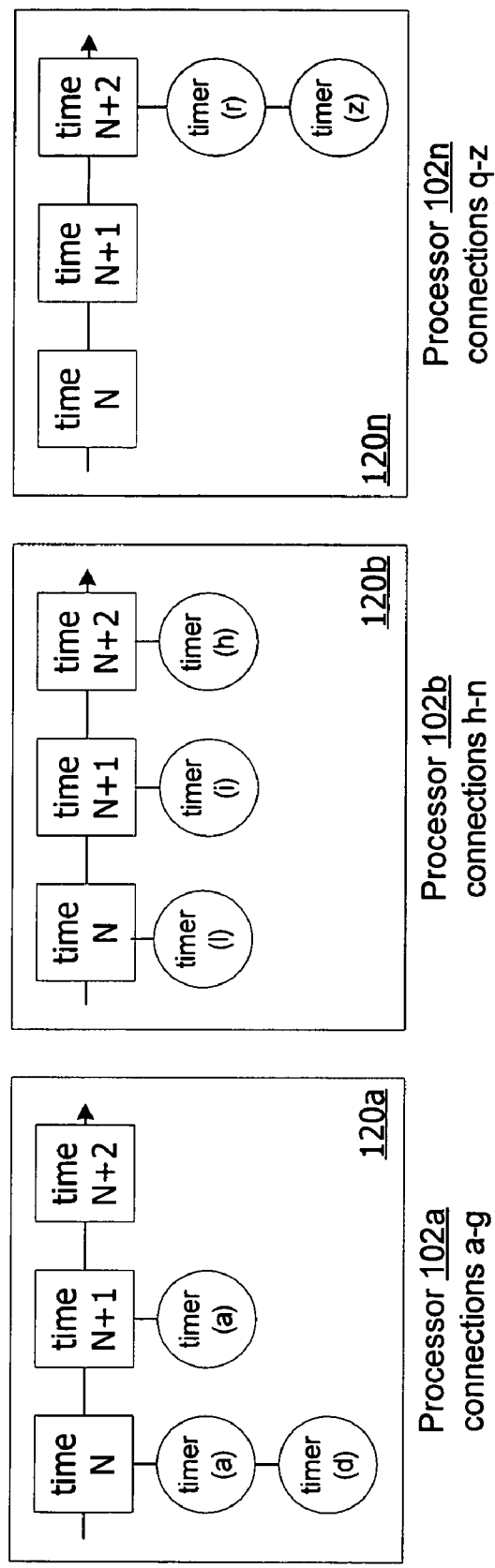
FIG. 2 is a diagram of multiple processor-specific timer data structures.

FIG. 2 depicts the same set of timers depicted in FIG. 1. However, in FIG. 2 these timers are distributed into multiple processor-specific data structures 120a-120n. In the example shown, the timers are distributed in accordance with a scheme that maps handling of received packets for a given connection to a processor. For example, in the example shown, packets received for connections (arbitrarily labeled) "a"-"g" are handled by processor 102a, while packets received for connections "q"-"z" are handled by processor 102n. As shown, the per-processor data structures 120a-120n includes those timers associated with connections mapped to a given processor. For example, the timer data structure 120a for processor 102a includes timers associated with connections "a"-"g" while the data structure 120n for processor 102n includes timers associated with connections "q"-"z".

Distributing timers can, potentially, eliminate access contention issues to the timers between processors. Additionally, many timer operations result in access of a connection's TCP Control Block (TCB) and/or other connection-specific data for a connection. By adhering to the same distribution of connections used to process received packets, the likelihood that a given connection's TCB will be in a processor's cache when a processor process handles the timers increases.

The processor-specific timer structures 120a-120n can be implemented in a wide variety of ways. For example, timer data structure 120a may be implemented as a circular linked list of buckets where each bucket can represent the root of a linked list of timers. A given timer can identify the connection, the type of timer, and other information. At a regular interval (e.g., 10 ms), a timer process on the processor 102a associated with a data structure 120a is triggered that "walks through" the list of timers associated with elapsed buckets.

That is, the timer process can handle each timer entry in a bucket's list in turn, for example, by updating a processor's TCB, causing a retransmit operation, and so forth.

Figure 3A:
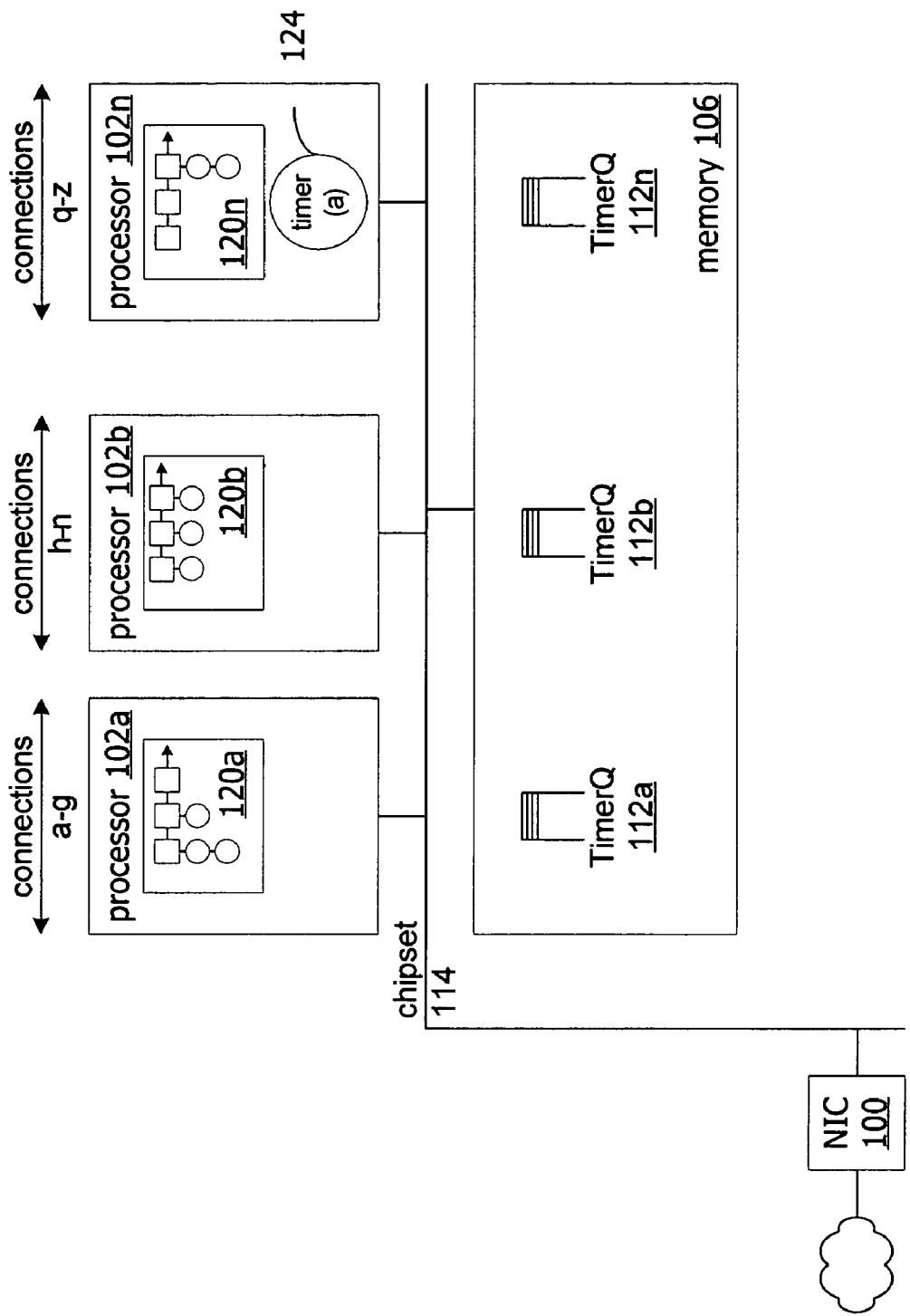
FIGS. 3A-3E are diagrams illustrating transfer of a timer across processors.

To illustrate operation of a sample system using per-processor timer data structures, FIG. 3A depicts a multi-processor 102a-102n system that includes memory 106 and one or more network interface controllers 100 (NICs). The NIC 100 includes circuitry that transforms the physical signals of a transmission medium into a packet, and vice versa. The NIC 100 circuitry also performs de-encapsulation, for example, to extract a TCP/IP packet from within an Ethernet frame.

The processors 102a-102b, memory 106, and network interface controller(s) are interconnected by a chipset 114 (shown as a line). The chipset 114 can include a variety of components such as a controller hub that couples the processors to I/O devices such as memory 106 and the network interface controller(s) 100.

The sample scheme shown does not include a TCP off-load engine. Instead, the system distributes different TCP operations to different components. While the NIC 100 and chipset 114 may perform some TCP operations (e.g., the NIC 100 may compute a segment checksum), most are handled by processor's 102a-102n.

Again, as shown, different connections may be mapped to different processors 102a-102n. For example, operations on packets belonging to connections "a" to "g" may be handled by processor 102a, while operations on packets belonging to connections "h" to "n" are handled by processor 102b. This mapping may be explicit (e.g., a table) or implicit.

In this system, in response to a received packet, the network interface controller 100 can determine which processor 102a-102n is mapped to the packet's connection, for example, by hashing packet data (the packet's "tuple") identifying the connection (e.g., a TCP/IP packet's Internet Protocol source and destination address and a TCP source and destination port). The network interface controller 100 can then enqueue packet or a packet descriptor (e.g., using Direct Memory Access (DMA)) to a processor or connection-specific receive queue corresponding to processor 102a. To alert the processor 102a of the arrival of a packet, the network interface controller 100 can signal an interrupt. Potentially, the controller 100 may use interrupt moderation which delays an interrupt for some period of time. This increases the likelihood multiple packets will have arrived before the interrupt is signaled, enabling a processor to work on a batch of packets and reducing the overall number of interrupts generated. In response to an interrupt, the processor 102a may dequeue and process the next entry (or entries) in its receive queue 110a. Processing can include navigating the TCP state machine for a connection, performing segment reordering and reassembly, tracking acknowledged bytes in a connection, managing connection windows, and so for (see The Internet's Engineering Task Force (IETF), Request For Comments #793). Since the processor 102a only processes packets for a limited subset of connections, the likelihood that the TCB for a connection remains in the processor's 102a cache increases.

As shown in FIG. 3A, each processor 102a-102n has its own associated timer data structure 120a-120n. These structures 120a-120n may reside in memory 106 and/or the cache of the associated processor 102a-102n.

For an on-going connection, timers are frequently armed and/or disarmed. When a timer originates on the "right" processor 102a (i.e., the processor mapped to the timer's connection), the processor 102a can modify its timer data structure 120a accordingly. However, a timer may originate or be handled by the "wrong" processor (i.e., a processor other than the processor mapped to the connection). For example, as shown in FIG. 3A, a timer 124 for connection "a" originates at processor 102n instead of the processor 102a. For instance, processor 102n may initiate a transmit operation that requires a corresponding retransmit timer to be scheduled.

Figure 3B:
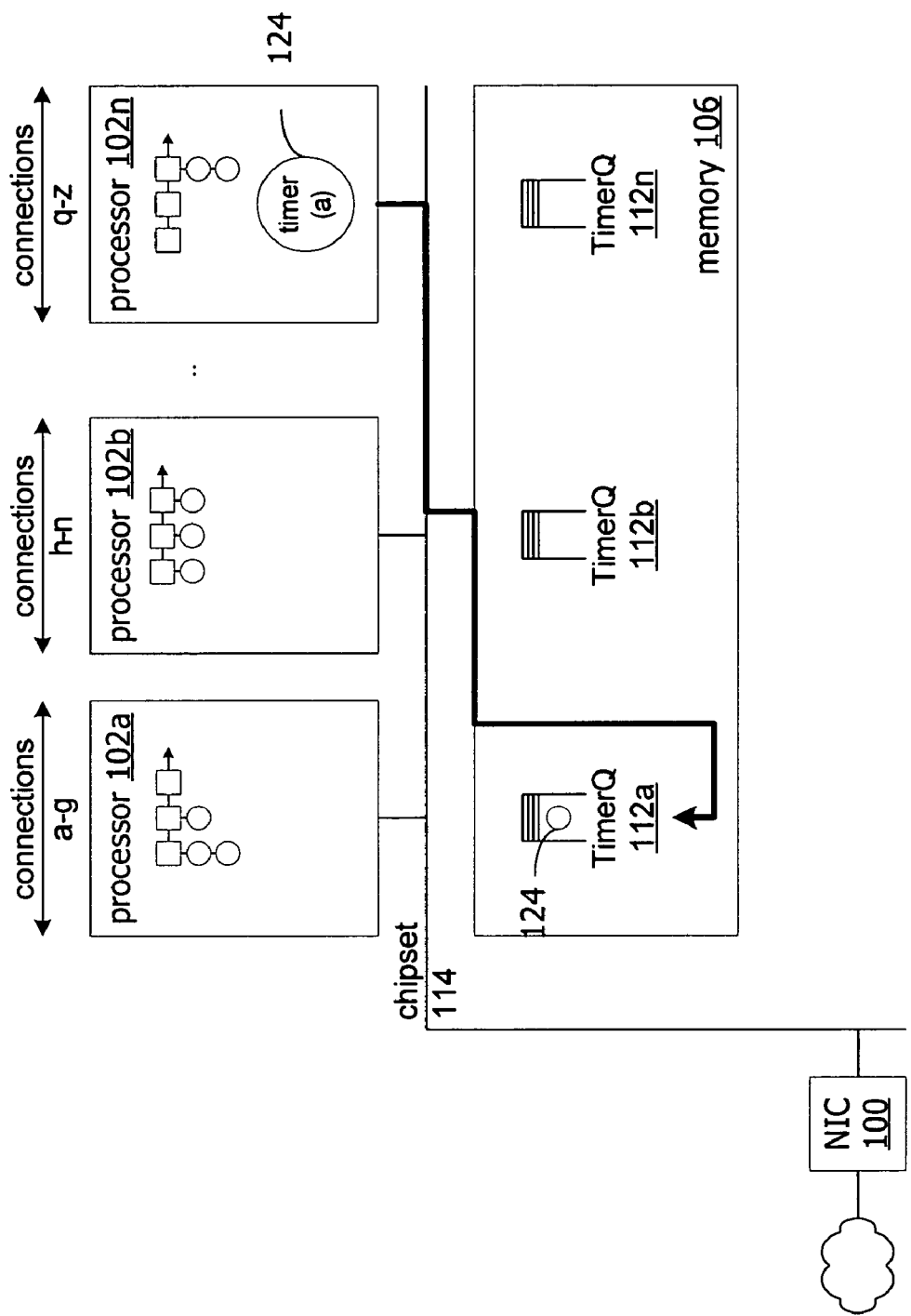

Potentially, in response to a new timer 124, the "wrong" processor 102n can modify the "right" processor's 102a timer data structure accordingly. However, such an approach may reintroduce many contention issues. Alternately, as shown in FIG. 3B, the "wrong" processor 102n can transfer the timer to the "right" processor 102a by enqueuing an entry for the timer 124 in a processor-specific 112a (labeled "TimerQ") or connection-specific queue. The entry may include timer data and/or include a reference to the timer data.

Figure 3C:
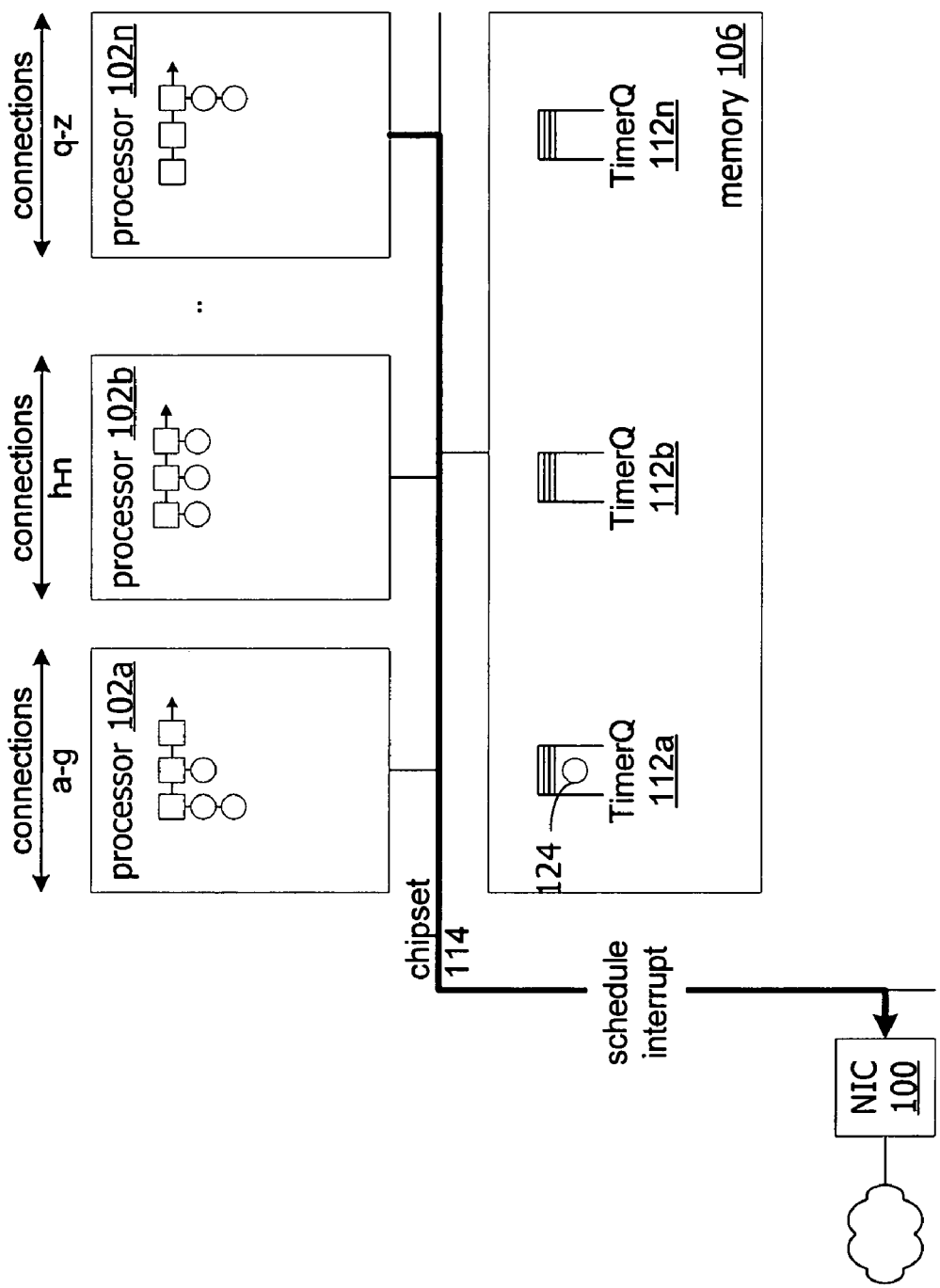
Figure 3D:
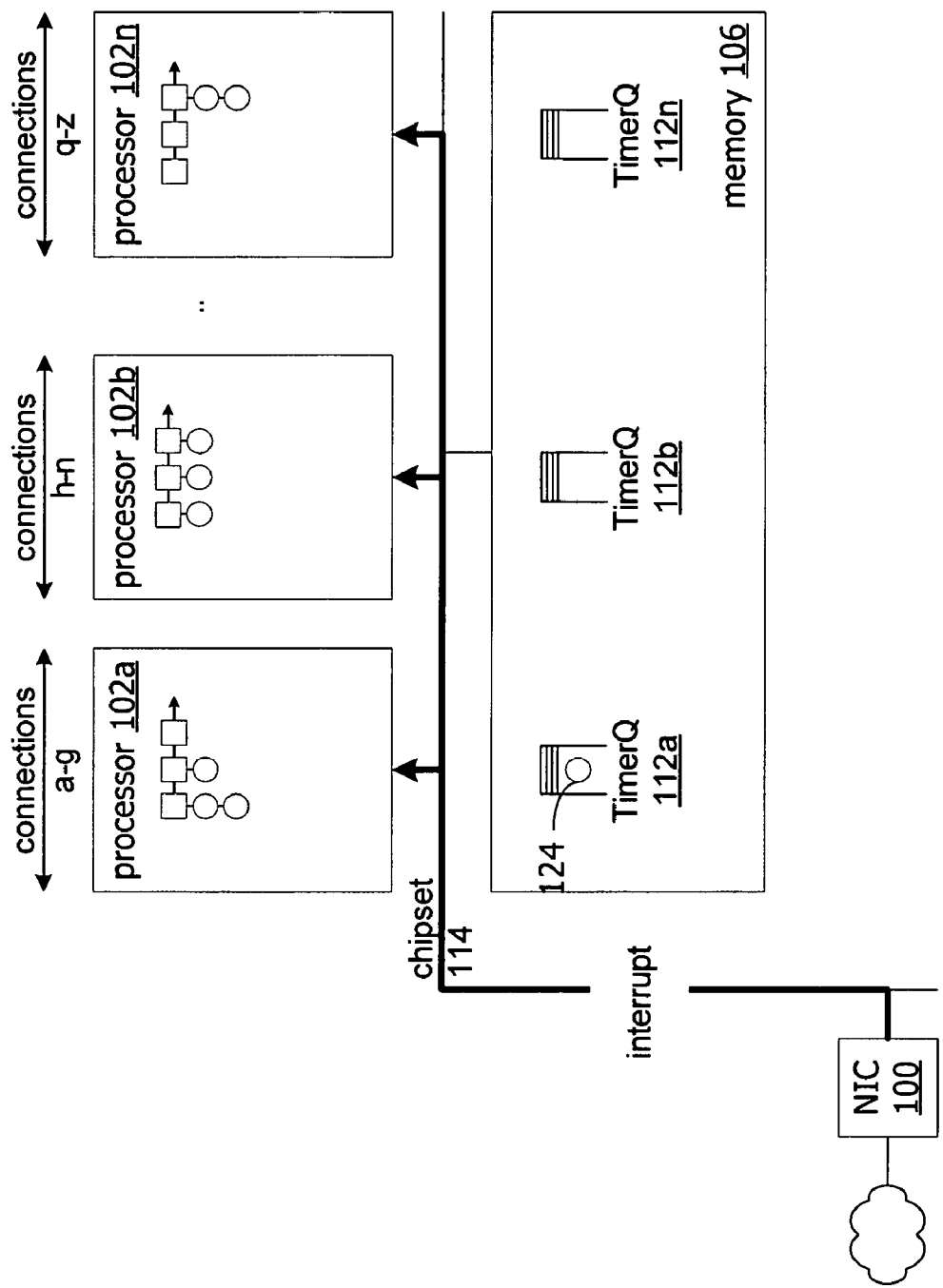

The processors 102a-102n may poll their processor-specific queues 112a (or the queues of mapped connections) for enqueued timer entries. Alternately, instead of polling, as shown in FIG. 3C, the "wrong" processor can schedule an interrupt on the network interface controller 100 and write data that enables the processors to identify the interrupt cause, for example, to distinguish the interrupt from a NIC 100 interrupt signaling arrival of received packets. For instance, processor 102n can set a software interrupt flag in an interrupt cause register maintained by the network interface controller 100. As shown in FIG. 3D, in response to the interrupt request, the network interface controller 100 signals an interrupt to the processors 102a-102n servicing connections. The network interface controller drivers operating on the processors 102a-102n respond to the interrupt by checking the data (e.g., flag(s)) indicating the interrupt cause.

Figure 3E:
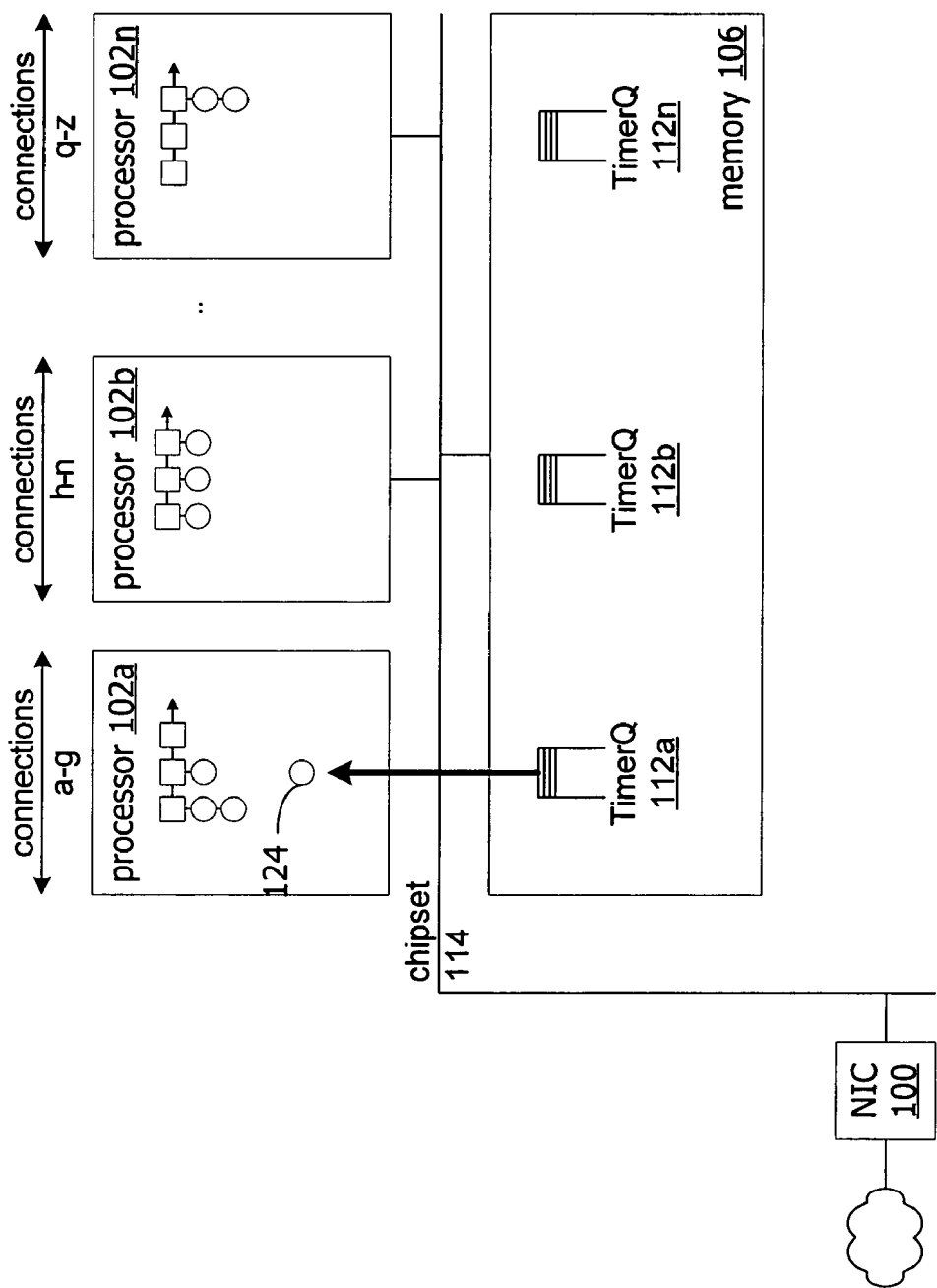

As shown in FIG. 3E, the "right" processor 102a can dequeue timer entries and modify its timer data structure 120a accordingly. Dequeuing entries from a processor's timer queue 112a may require a lock on the timer queue 112a. This lock, however, may be amortized over multiple packets and minimally affect the TCP fast path that processes segments with an application payload. Since modification of a given timer data structure 120a may be handled by the same instructions handling received packets, there is no need for locks on the timer data structure 120a during the modifications.

Timer entries can specify not only timer arming that causes insertion of a timer into a timer data structure 120a, but also timer disarming. Disarming may occur frequently. For example, a keep-alive timer may be disarmed after a packet is received for a previously dormant connection. Timer disarming may be split into two stages. For example, in response to a request to disarm a timer, the processor 102a may find and flag the timer entry as disarmed without actually removing the timer from the data structure 120a. The timer process that walks through the timers associated with a bucket can skip processing of timers flagged as disarmed. Like other timers, the disarmed timers are deleted from the data structure 120a during the "walk through" and the memory allocated to the disarmed timer may be freed. Thus, the flagging enables the complexity of extraction of a disarmed timer from a timer data structure to both be deferred and simplified.

Figure 5:
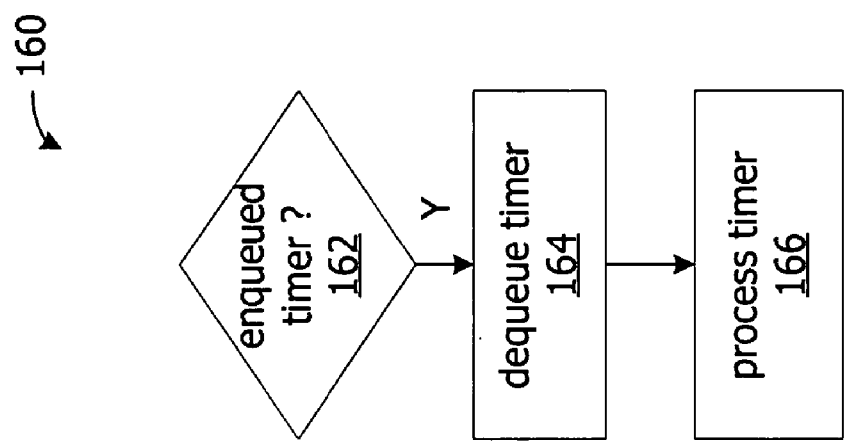
FIGS. 4 and 5 are flow-charts of processes implementing timer transfer across processors.
Figure 4:
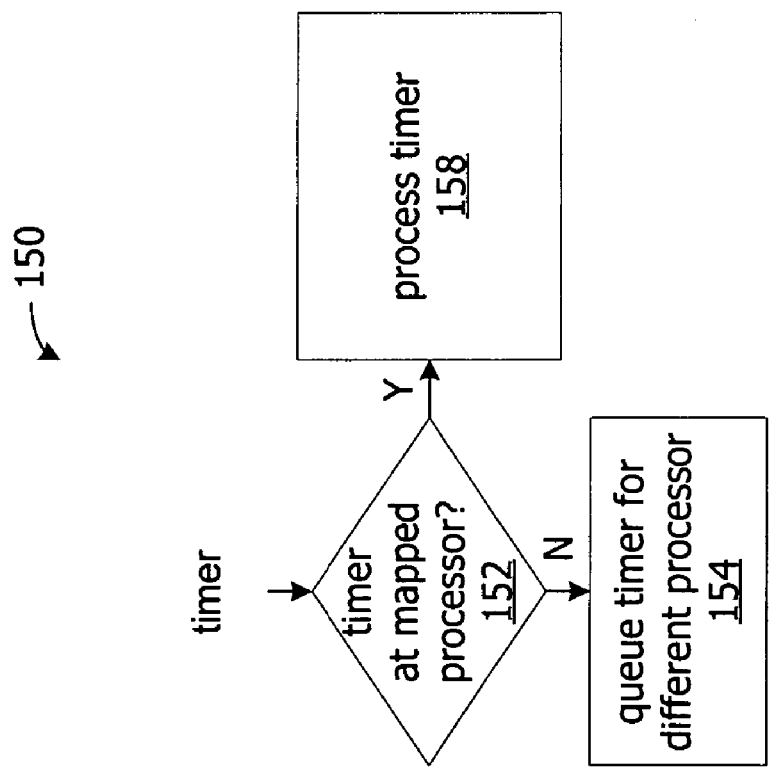

FIG. 4 and FIG. 5 illustrate processes implemented by the processors 102a-102n to transfer timers. In FIG. 4, a processor 102n determines 152 if the connection associated with a timer is mapped to a different processor 102a. If so, the processor 102n can enqueue 154 an entry for the timer. As shown in FIG. 5, the "right" processor can dequeue 162 the event data and perform the appropriate arming/disarming operations 164.

Though the description above repeatedly referred to TCP as an example of a protocol that can use techniques described above, these techniques may be used with many other protocols such as protocols at different layers within the TCP/IP protocol stack and/or protocols in different protocol stacks (e.g., Asynchronous Transfer Mode (ATM)). Further, within a TCP/IP stack, the IP version can include IPv4 and/or IPv6.

While FIGS. 3A-3E depicted a typical multi-processor host system, a wide variety of other multi-processor architectures may be used. For example, while the systems illustrated did not feature TOEs, an implementation may nevertheless feature them. Additionally, the term processor can include a CPU or other processor or programmable processor core.

The techniques above may be implemented using a wide variety of circuitry. The term circuitry as used herein includes hardwired circuitry, digital circuitry, analog circuitry, programmable circuitry, and so forth. The programmable circuitry may operate on computer programs disposed on a computer readable medium.

Other embodiments are within the scope of the following claims.

What is claimed is:

1. A method, comprising:

storing Transmission Control Protocol (TCP) timer entries for multiple TCP connections into multiple timer data structures, each of the timer data structures associated with a single different one of multiple processors processing TCP segments for the multiple TCP connections, each processor handling a different set of TCP connections, the TCP connections being mapped to the processors by a common network interface controller servicing each of the different processors, wherein each timer entry comprises an identification of a type of timer and identification of a TCP connection, wherein the types of timers include TCP retransmit and TCP keep alive timers, wherein each timer data structure is organized in buckets that list multiple timers expiring at a same time, wherein each bucket corresponds to a different point in time;

accessing a bucket of a one of the multiple timer data structures to determine timers expiring for TCP connections handled by the one of the different processors, the bucket accessed by the single one of the multiple processors associated with the one of the multiple timer data structures;

updating Transmission Control Blocks (TCBs) for TCP connections based on the expiring timers;

wherein the network interface controller determines a one of the multiple processors to handle a TCP segment of a TCP connection based on a hash of header data included the TCP segment and in an Internet Protocol datagram encapsulating the TCP segment, the header data comprising an Internet Protocol source address, an Internet Protocol destination address, a TCP source port, and a TCP destination port and wherein the timer entries for a TCP connection is stored in a one of the multiple respective timer data structures corresponding to the processor determined by the network interface controller for the TCP connection; and enqueuing an entry by a first one of the multiple processors for a second one of the multiple processors to identify to the second one of the multiple processors a timer associated with a TCP connection mapped to the second one of the multiple processors and not the first one of the multiple processors.

2. A computer program product, disposed on a computer readable medium, comprising instructions for causing a processor system to:

store Transmission Control Protocol (TCP) timer entries for multiple TCP connections into multiple timer data structures, each of the timer data structures associated with a single different one of multiple processors processing TCP segments for the multiple TCP connections, each processor handling a different set of TCP connections, the TCP connections being mapped to the processors by a common network interface controller servicing each of the different processors, wherein each timer entry comprises an identification of a type of timer and identification of a TCP connection, wherein the types of timers include TCP retransmit and TCP keep alive timers, wherein each timer data structure is organized in buckets that list multiple timers expiring at a same time, wherein each bucket corresponds to a different point in time;

access a bucket of a one of the multiple timer data structures to determine timers expiring for TCP connections handled by the one of the different processors, the bucket accessed by the single one of the multiple processors associated with the one of the multiple timer data structures;

update Transmission Control Blocks (TCBs) for TCP connections based on the expiring timers;

wherein the network interface controller determines a one of the multiple processors to handle TCP segments of a TCP connection based on a hash of header data included the TCP segment and in an Internet Protocol datagram encapsulating the TCP segment, the header data comprising an Internet Protocol source address, an Internet Protocol destination address, a TCP source port, and a TCP destination port and wherein the timer entries for a TCP connection is stored in a one of the multiple respective timer data structures corresponding to the processor determined by the network interface controller for the TCP connection; and enqueue an entry by a first one of the multiple processors for a second one of the multiple processors to identify to the second one of the multiple processors a timer associated with a TCP connection mapped to the second one of the multiple processors and not the first one of the multiple processors.

* * * * *